Patented May 18, 1937

2,081,005

UNITED STATES PATENT OFFICE 2,081,005

PROCESS FOR BREAKING PETROLEUM EMULSIONS

Melvin De Groote, St. Louis, and Arthur F. Wirtel, Kirkwood, Mo., assignors to Tretolite Company, Webster Groves, Mo., a corporation of Missouri No Drawing. Application September 18, 1936, Serial No. 101,436

12 Claims. (Cl. 196—4)

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottom of oil storage tanks, and are commonly referred to as "cut oil", "roily oil", "emulsified oil" and "bottom settlings".

The object of our invention is to provide a novel and inexpensive process for separating emulsions of the character referred to into their component parts of oil and water or brine.

Briefly described, our process consists in subjecting a petroleum emulsion of the water-in-oil type to the action of a treating agent or demulsifying agent of the kind hereinafter described, thereby causing the emulsion to break down and separate into its component parts of oil and water or brine, when the emulsion is permitted to remain in a quiescent state after treatment, or is subjected to other equivalent separatory procedures.

The treating agent or demulsifying agent contemplated by our process consists of or comprises an alkylated naphthalene sulfonic acid body in the form of a polyhydric alcohol substituted phenyl alkylamine salt of the kind hereinafter described, in which at least one of the alkyl groups substituted in the naphthalene nucleus contains not less than three carbon atoms and not more than ten carbon atoms. Such products are nuclear substituted products.

Commercial demulsifying agents employed for breaking or resolving oil field emulsions include, among other substances, substituted polycyclic aromatic sulfonic acids, or their salts. The type which finds most frequent application is obtained by introducing one, two or more alkyl groups into a naphthalene residue and then producing the sulfonic acid. Due to the corrosiveness of the sulfonic acid, it is the usual practice to employ the reagent in the form of a salt, such as an ammonium salt, potassium salt, sodium salt, etc.

We have found that if the alkylated aromatic sulfonic acids of the kind previously referred to are neutralized by means of a polyhydric alcohol substituted phenyl alkylamine of the kind hereinafter described, one obtains a treating agent or demulsifying agent of unusual effectiveness. Such substituted phenyl alkylamines employed to neutralize the various alkylated polycyclic sulfonic acids include the kind in which the substituting group is derived from a polyhydric alcohol or polyhydric alcohol ether, and still contains a residual hydroxyl. In order that the composition of these substituted phenyl alkylamines may be fully understood, their method of preparation will be described.

It is known that glycerol chlorhydrins, for instance, glycerol mono-chlorhydrin or glycerol di-chlorhydrin, can react with alkylamines, such as mono-amylamine or di-amylamine, to produce amyl amino propanediols. Similarly, glycerol di-chlorhydrin can be combined with amylamine or di-amylamine to form amyl amino propanols (see U. S. Letters Patent No. 2,042,621, dated June 2, 1936, to Olin). Similar compounds are obtained by reactions involving a secondary amine and glycidol (see Journal of American Chemical Society, 1932, pp. 1521 and 1528). Such reactions involving glycidol may also be employed in connection with primary amines. We have found that such reactions may be caused to take place between benzylamine or the like and glycerol mono-chlorhydrin or glycerol di-chlorhydrin, to produce a substituted benzylamine compound, for example, in which a substituted group is derived from a polyhydric alcohol and is characterized by at least one residual hydroxyl. The reaction between glycerol mono-chlorhydrin and benzylamine will be employed as an illustration and is as follows:

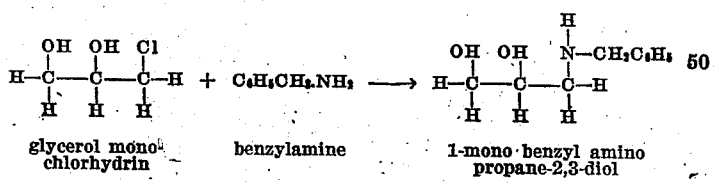

glycerol monochlorhydrin    benzylamine    1-mono-benzyl amino propane-2,3-diol

The reaction between glycerol di-chlorhydrin and benzylamine is illustrated as follows:

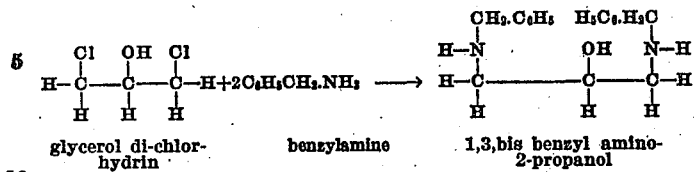

glycerol di-chlor-      benzylamine        1,3,bis benzyl amino-
    hydrin                                      2-propanol It is furthermore known that two molecules of glycerol mono-chlorhydrin can react with one molecule of benzylamine to give a bis-glycero-benzylamine. This reaction is illustrated as follows:

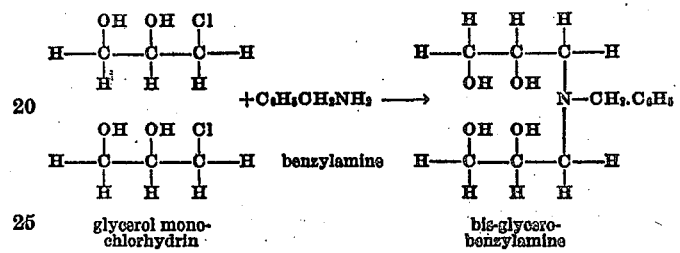

glycerol mono-                              bis-glycero-
chlorhydrin                                 benzylamine It may be desirable to point out that the liberation of hydrochloric acid may result in a combination with the amine to produce substituted ammonia chloride or an amine hydrochloride. For this reason it is customary to treat the mass after reaction with sodium or potassium hydroxide until strongly alkaline, so as to liberate the free base.

As has been previously indicated, the same products may be obtained by reaction involving glycidol and benzylamine, as indicated below:

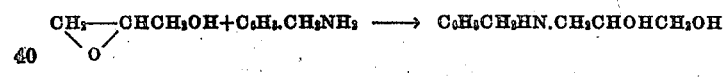

Similarly, two molecules of glycidol may react with one molecule of benzylamine.

The reaction of the kind described is not limited to a triol derivative, but may also be applied in connection with a diol derivative. For instance, ethylene chlorhydrin (glycol chlorhydrin) can be reacted with benzylamine, as indicated in the following reaction:

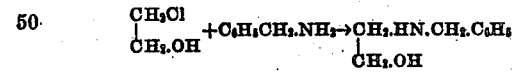

Similarly, the same product can be obtained involving ethylene oxide in the following manner:

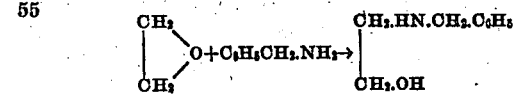

Similar products may be obtained in which two molecules of ethylene chlorhydrin or ethylene oxide united with one molecule of benzylamine to give a product indicated by the following formula:

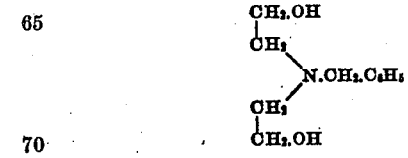

Products may be obtained by reactions involving the chlorhydrins of propylene glycol, butylene glycol, amylene glycol, hexylene glycol, etc. In some instances, the glycols may exist in various isomeric forms, and it is intended that all isomeric forms be included, because one form is just as suitable as another. Propylene glycol is just as suitable as triethylene glycol. Other isomeric forms include heptamethylene glycol, nonamethylene glycol, decamethylene glycol, undecamethylene glycol, tri-decamethylene glycol, tetradecamethylene glycol, and octadecamethylene glycol.

Instead of ethylene oxide, one may employ propylene oxide, butylene oxide, amylene oxide etc.

Just as the chlorhydrins derived from glycerol or glycols may be employed, similarly, the chlorhydrins derived from glycerol ethers or glycol ethers may be used to equal advantage. If any suitable polyhydric alcohol ether containing two or more hydroxyl groups is converted into a chlorhydrin having at least one residual hydroxy group, then such an intermediate product is suitable for reaction with benzylamine to give the final substituted benzylamine which may be used, if desired, to neutralize the alkylated sulfonic acid, so as to produce a demulsifying agent of the kind employed in the present process.

The method of manufacture of mono-chlorhydrins or di-chlorhydrins from glycerol is well known. The manufacture of glycerol chlorhydrin and glycerol di-chlorhydrin is described in Organic Syntheses, collective Volume I, Gilman, pp 286 and 288. The same methods may be employed in the manufacture of chlorhydrins from the polyhydric alcohol ethers, except that for use in manufacturing the reagent of the present process, it is not necessary to go through the purification steps, insofar that a product containing a bulk of such chlorhydrins, for instance 65–75%, may be used, if desired, in place of the purified product. The manufacture of chlorhydrins is equally satisfactory, regardless of whether the polyhydric alcohol ether appears to be derived from a glycol or a glycerol, or from glycerol and a glycol, or from a glycerol and mono-hydric alcohol, or other possible combinations.

Having obtained a polyglycerol or polyglycol ether chlorhydrin, containing at least one residual hydroxyl, the next step is reaction with benzylamine, so as to produce the substituted benzylamine of the kind contemplated in the present process.

For purposes of illustration, the reaction will be illustrated by the use of di-glycerol, as an example, although it is understood that any of the various chlorhydrins of the kind specified as without limitation as to any isomeric form, may be used.

Although di-glycerol may occur in three different isomeric forms, it may be illustrated by the following formula:

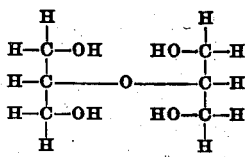

Such di-glycerol may be converted into either the mono-chlorhydrin or the di-chlorhydrin, in the same manner that glycerol is so converted. For purpose of illustration, the reaction involving the mono-chlorhydrin will be described. The mono-chlorhydrin has the following composition:

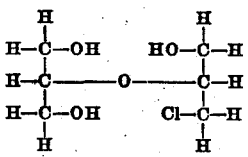

When such a product is reacted with benzylamine, reaction takes place with the elimination of hydrogen chloride, which may combine with the reacted amine or with the substituted amine. Since the chloride or hydrochloride is decomposed by subsequent reaction with strong caustic soda, it will be ignored and the reaction simply illustrated as follows:

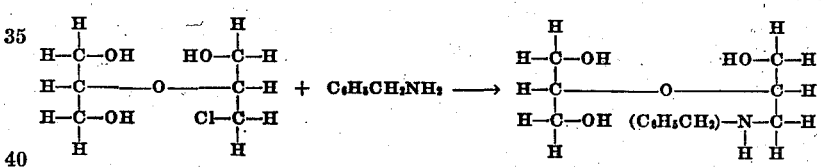

Other reactions may involve two molecules of benzylamine and one molecule of the di-chlorhydrin, which compound may be illustrated by the following formula:

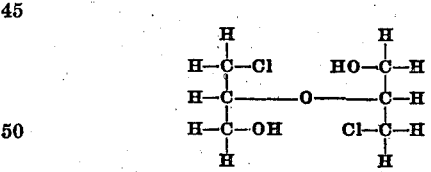

Some reactions may involve two molecules of the mono-chlorhydrin and one molecule of the benzylamine, with the elimination of two hydrogen atoms from the benzylamine. If one were able to produce tri-chlorhydrins from di-glycerol ethers, such products would be suitable for use and might produce a more complex compound of increased efficiency.

Di-glycerol is suitably prepared in the manner described in U. S. Patent No. 1,126,467, dated January 26, 1915, to Hibbert. Glycerol may also be converted into tri-glycerol, or even higher glycerols. The various glycol ethers can be prepared by the same process or other processes may be employed, as in the manufacture of polyglycerols. Di-ethylene glycol is a commodity available in the open market. Penta-ethylene glycol has been prepared having two hydroxyl groups and four ether groups. In the case of polyglycerols one might even combine a glycerol or a polyglycerol with a mono-hydric alcohol, so as to obtain an ether containing at least two hydroxyls. As previously pointed out, any suitable polyhydric alcohol ether, whether derived from glycerol or from glycols, or from a mixture of the two, or from glycerol and a mono-hydric alcohol, provided that there are two or more hydroxyl groups, may be converted into a chlorhydrin in the same manner employed in the manufacture of glycerol chlorhydrin, and such material may be reacted in the same manner as in the reaction previously described involving glycerol chlorhydrins, glycol chlorhydrin, or glycerol ether chlorhydrins. It is not intended to differentiate between isomeric forms when they exist.

It is known that benzylamine can be derived from benzyl alcohol, which is $C_6H_5.CH_2OH$, or phenyl carbinol (phenyl methyl alcohol). One, of course, can have various homologues of this alcohol obtainable by substitution either in the ring or in the side chain. Phenyl ethyl alcohol or phenyl methyl carbinol, which is an isomer of phenyl ethyl alcohol, can be converted into the corresponding amines. Various substituted benzyl alcohols are known (see Textbook of Organic Chemistry, Bernthsen, 1933, p. 452). Such substituted benzyl alcohols can be converted into the corresponding amines, so as to yield substituted phenyl alkylamines or phenyl alkylamines; methyl or dimethyl benzylamine may be reacted with a suitable chlorhydrin. As herein used, the term "substituted phenyl alkylamines" is intended to refer to those products in which substitution has taken place in at least one of the amino hydrogen positions by a polyhydric alcohol ether residue, as described. The expression "phenyl alkylamines" will be herein used in its broadest sense to include all the various types, including the type where substitution takes place in the side chain only, or both the side chain and the ring.

It is understood that in the various reactions previously described, where benzylamine has been employed, any of the various phenyl alkylamines might be employed just as advantageously. Any halohydrin may be employed.

Insofar that the products employed as the demulsifying agent in the present process represents a phenyl alkylamine in which a polyhydric alcohol residue of the kind described has been substituted for one or more of the amino hydrogens, and since the aralkyl radical (phenyl alkyl radical) can be substituted in either the ring or in the side chain, it may be well to point out that the word "substituted" is used in the claims to mean substituted in place of at least one of the amino hydrogens, unless the context or terminology clearly indicates that the word "substituted", in a second occurrence, refers to either the phenyl radical, or the alkyl radical attached to the phenyl radical. Secondary dibenzyl amine and its homologues may be employed in the reactions previously described, involving benzylamine.

The material that we prefer to use as the demulsifying agent in our process consists of alkylated aromatic sulfonic acids of the kind previously described, neutralized with substituted phenyl alkylamines of the class previously specified. There does not appear to be any suitable explanation of the unusual superiority of the demulsifying agent employed in the present process, and similarly, there does not seem to be any basis by which one could anticipate or foresee this unusual effectiveness. Apparently, this marked improvement is not directly related to oil or water solubility, insofar that similar neutralization with other amines may yield compounds which have a greater solubility in oily materials or in water, and yet are not nearly as suitable and not nearly as effective in their demulsifying action.

The expressions "polyhydric alcohol", "di-hydric alcohol", "tri-hydric alcohol", etc. are frequently used to indicate materials containing two or more alcoholiform hydroxyls. The expression "di-glycerol" is often used instead of the more complete expression "di-glycerol ether". Similarly, "di-ethylene glycol" is sometimes used instead of the more complete expression "di-ethylene glycol ether". Hereinafter we will use the expression "polyhydric", "di-hydric" or "tri-hydric" alcohol to mean a compound in which there is present the indicated number of alcoholic hydroxyls, but without limitation as to the presence of oxygen in the ether linkage form. In other words, it is intended to include the alcohol ethers, as well as the alcohols containing no ether linkages. Thus, the expression "polyhydric alcohol" includes glycerol ether, as well as ethylene glycol itself. In such instances where reference may be made to substituting a polyhydric alcohol type free from oxygen in an ether linkage form, such materials may be referred to as "triol substituted" or "diol substituted". The broad class of materials contemplated for use in neutralizing the alkylated sulfonic acids, so as to yield the demulsifying agent employed in our process, will be referred to as "polyhydric alcohol substituted phenyl alkylamines", and the substituted phenyl alkylamines which are derived from the alcoholic type, as differentiated from the alcoholic ether type, will be referred to as "diol substituted" or "triol substituted phenyl alkylamines", or as "polyhydric alcohol substituted phenyl alkylamines of the kind in which the polyhydric alcohol radical is free from an ether linkage".

Apparently, there is some unlooked-for co-operation or chemical or physico-chemical relationship between the polyhydric alcohol substituted phenyl alkylamine residue and the sulfo-aromatic residue. The neutralization of other conventional acidic demulsifying reagents with polyhydric alcohol substituted phenyl alkylamines does not seem to produce any marked improvement over the corresponding sodium or ammonium salts, and in many cases, yields an inferior product, thus indicating that apparently the increased value does not reside in an additive effect, due to the polyhydric alcohol substituted benzylamine residue. If one neutralizes other sulfonic acids, which are known to be effective demulsifying agents, such as petroleum sulfonic acids of the mahogany acid type, with a polyhydric alcohol substituted phenyl alkylamine, one does not obtain a more effective demulsifying agent, and indeed, one is more likely to obtain a demulsifying agent which is less effective. Based on the results of actual tests obtained in a variety of emulsified crudes occurring in a number of the major oil fields of the United States, the conclusion one must inevitably reach is, that the result obtained by uniting the two residues, i. e., the polyhydric alcohol substituted phenyl alkylamine residue and the described sulfo-aromatic residue in a single molecule, results in an unlooked-for, unique quality, which could not be foreseen by the present knowledge of the art, and which produces a demulsifying agent that is particularly effective for a large number of emulsified crude oils.

Alkylated naphthalene sulfonic acids are produced commercially, and the salts are used for a variety of purposes. They are generally produced from naphthalene, because there does not appear to be any advantage in the use of a naphthalene derivative, such as chlor-naphthalene, alpha and beta naphthol, etc. In other words, one could introduce the sulfonic acid residue and the alkyl residues into a substituted naphthalene, such as chlor-naphthalene, etc., just as readily, perhaps, as in the case of naphthalene. Such simple derivatives, of course, are the chemical equivalent of naphthalene in the manufacture of such sulfonic acids as are employed in the manufacture of the present reagent. It is understood that the word "naphthalene" is hereinafter employed to include these derivatives, although, as pointed out, there is no advantage in using them, and the expense usually would be prohibitive.

The general process of manufacturing the demulsifying agent contemplated by our process consists in converting the naphthalene into either the alpha or beta naphthalene sulfonic acids or a mixture of the same, or, in some instances, into a di- or even a tri-sulfonic acid, or a tetra-sulfonic acid, or a mixture of the various types. In most instances, there is no advantage in introducing more than one sulfonic acid residue. In many instances, it is unnecessary to use particular care to prepare either only the alpha sulfonic acid, or either only the beta sulfonic acid, because a mixture in which either one or the other predominates, or a mixture in which the alpha and beta sulfonic acids are present in approximately equal amounts, is just as satisfactory as one sulfonic acid completely freed from the other type.

The alcohol employed, such as propyl alcohol, butyl alcohol, amyl alcohol, hexyl alcohol, decyl alcohol, etc., is converted into the acid sulfate, such as propyl hydrogen sulfate. The naphthalene sulfonic acid and the alkyl hydrogen sulfate are combined in proportions so that one, two, three, or even four alkyl groups are introduced into the aromatic residue. This condensation reaction is generally carried out in the presence of an excess of sulfuric acid. In some instances, the various reactions, such as sulfonation, sulfation, condensation, etc. are carried out simultaneously. Generally speaking, the di-alkylated and tri-alkylated material appear to yield the most desirable type of reagent. The presence of some mono-alkylated material, or some tetra-alkylated material is not objectionable, and may even be desirable.

It is obvious, of course, that the alkylated groups introduced might be derived from olefines, such as butylene, propylene, amylene, etc., insofar that such olefines react directly with sulfuric acid, to produce the alkyl hydrogen sulfates. Of course, in addition to introducing such alkyl residues of the kind described into the aromatic nucleus, one could also introduce an alkyl residue from some other alcohol, as, for example, an alkylated group derived from ethyl or methyl alcohol, or one might introduce a group derived from an aryl, aralkyl, cyclic or hydroaromatic alcohol or the like, but regardless of whether or not one introduces such other residues, it is necessary that at least one alkyl residue of the kind described, i. e., having at least three carbon atoms and not more than ten carbon atoms, be introduced into the naphthalene ring. Such compounds having some other residue present, such as methyl residue, might be considered as being derived from methyl naphthalene, instead of naphthalene, and thus, would fall within the class of chemical equivalents previously noted. It is immaterial as to the particular alcohol employed, or the particular isomeric form of the alcohol employed, although generally speaking, it is most desirable to use the one lowest in cost. It is immaterial whether one uses normal propyl alcohol or isopropyl alcohol. It is immaterial whether one uses a normal butyl or isobutyl alcohol. It is immaterial whether the alcohol be a primary alcohol, or a secondary alcohol, or a tertiary alcohol, or the like.

It is obvious that a large number of isomers can be produced in the manufacture of the reagent employed in the present process. For instance, although the sulfonic group may be introduced into either the alpha or beta position, it is manifest that the alkyl group or groups can be introduced into various positions in regard to the position of the sulfonic acid residue. Apparently, as far as we are aware, one isomeric form is as effective as the other. Reference to the compounds is not intended to indicate any particular isomer, unless the text clearly indicates some specific position.

Insofar that the most readily available alcohols, from the standpoint of cost, are isopropyl alcohol, normal butyl alcohol, isobutyl alcohol, and amyl alcohol, it is our preference to produce our reagents from these alcohols, and in some instances, it is desirable to introduce different alkyl groups, such as a propyl group and butyl group, into the same sulfo-naphthalene residue.

In the actual manufacture of alkylated naphthalene sulfonic acids, the completion of the desired chemical reactions is followed by a washing process which removes the excess of sulfuric acid or other sulfonation, sulfation, or condensation reagent employed. The acidic mass thus obtained is neutralized with a polyhydric alcohol substituted phenyl alkylamine in the same manner that sodium or potassium or ammonium hydroxides might usually be employed. The final product, if it represents a pasty or semi-solid or a solid mass, is rendered suitable for industrial use by the addition of a solvent, such as water, an alcohol, a coal tar solvent, a petroleum hydrocarbon solvent, or in any similar manner.

The demulsifying agent that we prefer to use in practising our process is obtained by a reaction in which three molecules of isopropyl alcohol are united with one molecule of naphthalene by the customary sulfation, sulfonation and condensation reactions. The resulting mixture consists largely of di-propyl naphthalene sulfonic acids and tri-propyl naphthalene sulfonic acids, with possibly small amounts of mono-propyl sulfonic acids and tetra-propyl sulfonic acids present. Generally speaking, it is easier to conduct the reaction so that the bulk of the sulfonic acid represents the beta type, although the alpha type may be produced, if desired. The product is neutralized with 1-mono-benzyl amino propane-2,3-diol, obtained in the manner previously indicated. This product is a mono-triol substituted benzylamine and may be referred to, for convenience, as mono-glycero benzylamine. The product so obtained is diluted with one or more solvents, so as to reduce its viscosity to that of ordinary castor oil, or slightly greater. The solvents which we preferably employ are a mixture of two or more of the following: Water, denatured alcohol, kerosene, or tar acid oil.

Among the reagents which are particularly effective are the polyhydric alcohol substituted benzylamine salts of the following alkylated naphthalene sulfonic acids, i. e., mono-isopropyl naphthalene sulfonic acids, di-isopropyl naphthalene sulfonic acids, tri-isopropyl naphthalene sulfonic acids, mono-normal butyl naphthalene sulfonic acids, di-normal butyl naphthalene sulfonic acids, mono-isobutyl napthalene sulfonic acids, di-isobutyl naphthalene sulfonic acids, mono-amyl naphthalene sulfonic acids, di-amyl naphthalene sulfonic acids, tri-amyl napthalene sulfonic acids, mono-hexyl naphthalene sulfonic acids, di-hexyl naphthalene sulfonic acids, tri-hexyl naphthalene sulfonic acids, mono-octyl naphthalene sulfonic acids, di-octyl naphthalene sulfonic acids, mono-decyl naphthalene sulfonic acids, di-decyl naphthalene sulfonic acids, mono-isopropyl di-normal butyl naphthalene sulfonic acids, di-isopropyl di-normal butyl naphthalene sulfonic acids, di-isopropyl mono-amyl naphthalene sulfonic acids, mono-isopropyl mono-hexyl naphthalene sulfonic acids, etc.

It may be desirable to indicate that there is sometimes some variation in nomenclature in regard to the salts derived from strong acids and various amines. For instance, the combination of aniline, and hydrochloric acid, is often referred to as aniline hydrochloride. When aniline hydrochloride is treated with caustic soda, aniline is regenerated and sodium chloride is formed. For this reason, and perhaps for other reasons, structural conditions are best expressed by referring to the compound as a hydrochloride, in order to indicate that one does not obtain the chloride of a quaternary ammonium compound. Similarly, the reaction of a polyhydric alcohol substituted benzylamine with a sulfonic acid may be considered as producing the polyhydric alcohol substituted benzylamine salt, although for reasons pointed out, such salt might be looked upon as a polyhydric alcohol substituted benzylamine hydroxy sulfonate, as well as being considered as a polyhydric alcohol substituted benzylamine sulfonate. Insofar that it is perfectly clear as to the chemical composition of the compound, it is immaterial which nomenclature is employed.

In such instances where there is present more than one sulfonic acid residue, as in the formation of a di-sulfonic acid, or a tri-sulfonic acid, if desired, all the sulfonic acid hydrogen may be neutralized with polyhydric alcohol substituted benzylamine, or one sulfonic hydrogen may be so neutralized with it and the other sulfonic hydrogen atom or atoms may be neutralized with some other suitable base, such as sodium hydroxide, potassium hydroxide, ammonium hydroxide, etc.

Polyhydric alcohol substituted benzylamine salts, such as the hydrochloride, may react by double decomposition with alkali sulfonates in a suitable medium to produce the polyhydric alcohol substituted benzylamine sulfonate.

Conventional demulsifying agents employed in the treatment of oil field emulsions are used as such, or after dilution with any suitable solvent, such as water, petroleum hydrocarbons, such as gasoline, kerosene, stove oil, a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials employed as the demulsifying agent of our process may be admixed with one or more of the solvents customarily used in connection with conventional demulsifying agents. Moreover, said material or materials may be used alone or in admixture with other suitable well known classes of demulsifying agents, such as demulsifying agents of the modified fatty acid type, the petroleum sulfonate type, the alkylated sulfo-aromatic type, in which the sulfonic hydrogen is neutralized by the use of some base other than polyhydric alcohol substituted benzylamine.

It is well known that conventional demulsifying agents may be used in a water-soluble form, or in an oil-soluble form, or in a form exhibiting both oil and water solubility. Sometimes they may be used in a form which exhibits relatively limited water solubility and relatively limited oil solubility. However, since such reagents are sometimes used in a ratio of 1 to 10,000 or 1 to 20,000, or even 1 to 30,000, such an apparent insolubility in oil and water is not significant, because said reagents undoubtedly have solubility within the concentration employed. This same fact is true in regard to the material or materials employed as the demulsifying agent of our process.

We desire to point out that the superiority of the reagent or demulsifying agent contemplated in our process is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but we have found that such a demulsifying agent has commercial value, as it will economically break or resolve oil field emulsions in a number of cases which cannot be treated as easily or at so low a cost with the demulsifying agents heretofore available.

Having thus described our invention, what we claim as new and desire to secure by Letters Patent is:

1. A process for breaking petroleum emulsions of the water-in-oil type, which consists in subjecting the emulsion to the action of a demulsifying agent comprising a polyhydric alcohol substituted phenyl alkylamine salt of an alkylated naphthalene sulfonic acid in which at least one alkyl group substituted in the naphthalene nucleus contains at least three carbon atoms and not more than ten carbon atoms.

2. A process for breaking petroleum emulsions of the water-in-oil type, which consists in subjecting the emulsion to the action of a demulsifying agent comprising a chemical compound of the formula type:

$$[(Y)_{n'}(OH)_{n'}(OH)_{n'}]_n H_m [N(T)_n]_n . H D . (SO_3)_{m'}$$

in which Y is a hydrocarbon radical, T is an aralkyl radical, $D(SO_3)_{m'}$ is the residue derived from an alkylated naphthalene sulfonic acid in which at least one alkyl group containing at least three carbon atoms and not more than ten carbon atoms has been introduced into the naphthalene nucleus, $m$ represents the numeral zero or one, $n$ represents the numeral 1 or 2, $n'$ represents the numeral 1 or more, $m'$ represents the numeral 1, 2 or 3.

3. A process for breaking petroleum emulsions of the water-in-oil type, which consists in subjecting the emulsion to the action of a demulsifying agent comprising a polyhydric alcohol substituted phenylalkylamine salt of an alkylated naphthalene sulfonic acid in which at least one alkyl group substituted in the naphthalene nucleus contains at least three carbon atoms and not more than ten carbon atoms, and being additionally characterized by the fact that the phenyl group is substituted.

4. A process for breaking petroleum emulsions of the water-in-oil type, which consists in subjecting the emulsion to the action of a demulsifying agent comprising a polyhydric alcohol substituted phenyl alkylamine salt of an alkylated naphthalene sulfonic acid in which at least one alkyl group substituted in the naphthalene nucleus contains at least three carbon atoms and not more than ten carbon atoms, and being additionally characterized by the fact that the phenyl group is free from substituents.

5. A process for breaking petroleum emulsions of the water-in-oil type, which consists in subjecting the emulsion to the action of a demulsifying agent comprising a polyhydric alcohol substituted benzylamine salt of an alkylated naphthalene sulfonic acid in which at least one alkyl group substituted in the naphthalene nucleus contains at least three carbon atoms and not more than ten carbon atoms.

6. A process for breaking petroleum emulsions of the water-in-oil type, which consists in subjecting the emulsion to the action of a demulsifying agent comprising a polyhydric alcohol substituted benzylamine salt of an alkylated naphthalene sulfonic acid in which at least one alkyl group substituted in the naphthalene nucleus contains at least three carbon atoms and not more than ten carbon atoms, and being additionally characterized by the fact that the polyhydric alcohol residue is free from an ether linkage.

7. A process for breaking petroleum emulsions of the water-in-oil type, which consists in subjecting the emulsion to the action of a demulsifying agent comprising a polyhydric alcohol substituted benzylamine salt of an alkylated naphthalene mono-sulfonic acid, in which at least one alkyl group substituted in the naphthalene nucleus contains at least three carbon atoms and not more than ten carbon atoms, and being additionally characterized by the fact that the polyhydric alcohol residue is free from an ether linkage.

8. A process for breaking petroleum emulsions of the water-in-oil type, which consists in subjecting the emulsion to the action of a demulsifying agent comprising a polyhydric alcohol substituted benzylamine salt of a butylated naphthalene mono-sulfonic acid, and being additionally characterized by the fact that the polyhydric alcohol residue is free from an ether linkage.

9. A process for breaking petroleum emulsions of the water-in-oil type, which consists in subjecting the emulsion to the action of a demulsifying agent comprising a polyhydric alcohol substituted benzylamine salt of an amylated naphthalene mono-sulfonic acid, and being additionally characterized by the fact that the polyhydric alcohol residue is free from an ether linkage.

10. A process for breaking petroleum emulsions of the water-in-oil type, which consists in subjecting the emulsion to the action of a demulsifying agent comprising a polyhydric alcohol substituted benzylamine salt of a propylated naphthalene mono-sulfonic acid, and being additionally characterized by the fact that the polyhydric alcohol residue is free from an ether linkage.

11. A process for breaking petroleum emulsions of the water-in-oil type, which consists in subjecting the emulsion to the action of a demulsifying agent comprising a mono-glycero benzylamine salt of a propylated naphthalene mono-sulfonic acid admixed with a suitable solvent.

12. A process for breaking petroleum emulsions of the water-in-oil type, which consists in subjecting the emulsion to the action of a demulsifying agent obtained by converting naphthalene into the mono-sulfonic acid; converting propyl alcohol into the acid sulfate; combining said materials in molecular proportions in presence of sulfuric acid as a condensing agent; followed by the conventional washing process and separation of the aqueous waste acid and neutralization of the sulfonic acid by means of mono-glycero benzylamine, followed by addition of a suitable solvent.

MELVIN DE GROOTE.
ARTHUR F. WIRTEL.